United States Patent [19]

Hehl

[11] Patent Number: 5,482,452
[45] Date of Patent: Jan. 9, 1996

[54] INJECTION MOLDING UNIT FOR USE IN AN INJECTION MOLDING MACHINE FOR PROCESSING SYNTHETIC MATERIAL

[76] Inventor: Karl Hehl, Arthur-Hehl-Str. 32, D-72290 Lossburg, Germany

[21] Appl. No.: 249,849

[22] Filed: May 26, 1994

[30] Foreign Application Priority Data

May 29, 1993 [DE] Germany ............ 43 17 998.3

[51] Int. Cl.[6] .................................. B29C 45/80
[52] U.S. Cl. ........................ 425/145; 425/150; 425/589
[58] Field of Search ........................ 425/145, 149, 425/150, 589

[56] References Cited

FOREIGN PATENT DOCUMENTS

| | | |
|---|---|---|
| 0188622 | 7/1986 | European Pat. Off. . |
| 0328671 | 8/1989 | European Pat. Off. . |
| 0427866 | 5/1991 | European Pat. Off. . |
| 7046626 | 3/1971 | Germany . |
| 2719067 | 11/1978 | Germany . |
| 3735419 | 5/1989 | Germany . |
| 4142927 | 7/1993 | Germany . |

OTHER PUBLICATIONS

Fanuc Ltd prospectus, "Fanuc Autoshot T Series", 1990, 6 pp.

*Primary Examiner*—Tim Heitbrink
*Attorney, Agent, or Firm*—Spencer, Frank & Schneider

[57] ABSTRACT

In a injection molding unit for use in an injection molding machine for processing synthetic material a driving unit is provided for axially displacing the injection molding unit in a direction of an injection axis. An injection unit, symmetrically arranged with respect to the injection axis, is provided for axially driving a rotatable feed screw placed inside a plasticizing cylinder. The injection unit is connected with an injection bridge. Since the driving unit is also arranged symmetrically with respect to the injection axis and is integrated in the injection molding unit, it is possible to realize a moment free nozzle contact point and a compact injection molding unit in a simple constructional way.

25 Claims, 15 Drawing Sheets

INJECTION MOLDING UNIT FOR USE IN AN INJECTION MOLDING MACHINE FOR PROCESSING SYNTHETIC MATERIAL

BACKGROUND OF THE INVENTION

1. Field of the Invention

This invention relates to an injection molding unit for use in an injection molding machine for processing synthetic materials comprising a plasticizing cylinder, which is mounted in a carrier block, a driving unit, such as a mechanical driving unit, for axial displacement of the injection molding unit in a direction of an injection axis, an injection unit, such as a mechanical injection unit, arranged symmetrically with respect to the injection axis, adapted to axially drive a feeding means located in the plasticizing cylinder and an injection bridge connected with the injection unit.

2. Description of the Prior Art

European Published Patent Application EP-A-328671 discloses an injection unit of that kind, in which electromechanical spindle drives are provided for axial displacement of the feed screw and for contacting the nozzle to the injection mold. In such an arrangement, however, only the force initiation for the axial movement of the feed screw is effected symmetrically with respect to the injection axis, whereas the displacement of the injection molding unit is effected asymmetrically with respect to the injection axis, so that distortions might occur when the nozzle is contacted. Since an abutment for the driving unit is provided at the machine base for the movement of the injection molding unit, it requires a lot of installation work to transfer the injection molding unit, for example, into a vertical position where it can inject into the parting plane or to make it accessible to a linear gating.

A further injection molding unit of that kind is also known from European Published Patent Application 0 427 866, in which a ball rolling spindle is mounted at a stationary plate in such a way, that a second plate is axially displaced during rotation of the spindles. The second plate is connected with the feed screw, so that the axial movement effects the axial displacement of the feed screw. In this arrangement the driving unit for displacement of the whole injection molding unit is understood not to be a part of the injection molding unit itself and for that reason the injection molding unit itself can only be driven from the outside. The contact forces for the nozzle act outside the injection axis and separate guidings are necessary for the movement of the injection molding unit.

The leaflet Fanuc Autoshot T series, model 50D/75D/100D/150D/225D/300D, page 8, discloses an injection molding unit, in which spindle drives, driven by toothed belts, are provided for the injection process. However, in this unit separate guidings, located outside, are provided as guiding elements for the injection molding unit and for displacement of the injection bridge.

Finally, in the field of hydraulic driven injection molding units, German Utility Model 70 46 626 discloses an arrangement, in which the driving unit, symmetrically arranged with respect to the injection axis, and the injection molding unit are nested. However, this type of construction obviously did not give incitations for the field of electromechanical drives or hybrid machines, in which one unit is driven electromechanically and the other hydraulically.

SUMMARY OF THE INVENTION

It is an object of the invention to provide an injection molding unit for processing synthetic materials, which is of the kind described first hereinbefore, in that a moment free nozzle contact point and a compact injection molding unit can be realized in a simple constructional way.

That object is accomplished in accordance with the invention in that the driving unit is also arranged symmetrically with respect to the injection axis and integrated in the injection molding unit, or in that the driving unit is hydraulically driven and also arranged symmetrically with respect to the injection axis and integrated in the injection molding unit, or in that the mechanical driving unit is also arranged symmetrically with respect to the injection axis and integrated in the injection molding unit.

The advantage offered in such an arrangement is that both the driving unit and the injection unit are arranged symmetrically with respect to the injection axis, so that distortions and inaccuracies during the nozzle contacting are avoided. The driving unit is integrated in the injection molding unit, thus making it possible to transfer the injection molding unit into such a position that an injection into the parting plane is realizable or to displace the injection molding unit laterally so that an injection for linear gating is realizable. The driving unit and the injection unit are either both mechanically driven or one of the two units is mechanically driven and the other is hydraulically driven.

BRIEF DESCRIPTION OF THE DRAWING

FIG. 9,10 are sectional views through the die cushion in distressed and stressed condition.

DETAILED DESCRIPTION OF THE PREFERRED EMBODIMENTS

Figure 1:
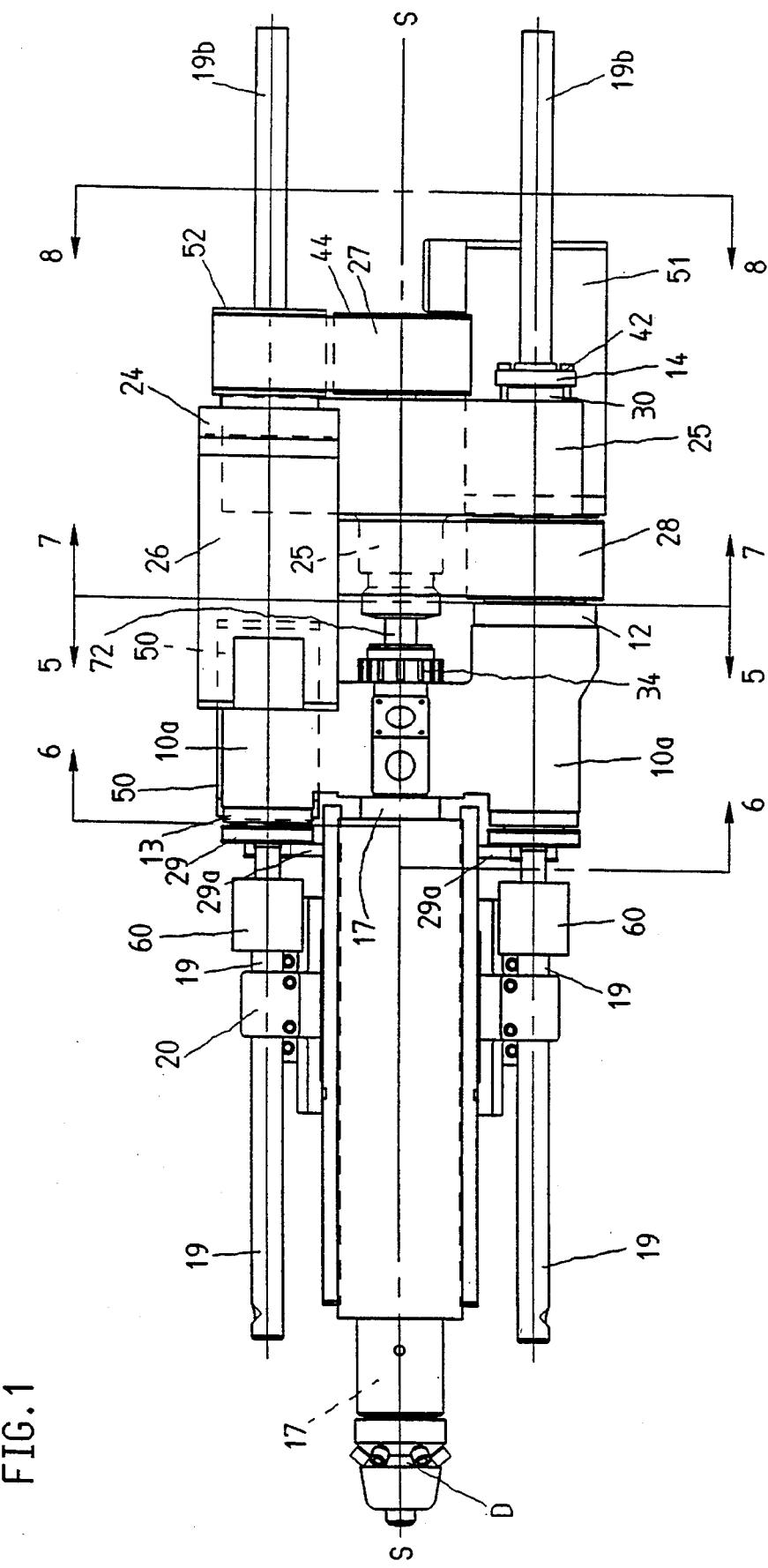
FIG. 1 is a top view of the injection molding unit.

The invention will now be described in more detail by example with reference to the embodiments shown in the figures. It should be kept in mind that the following described embodiments are only presented by way of example and should not necessarily be construed as limiting the inventive concept to any particular physical configuration.

The injection molding unit of an injection molding machine is provided with a plasticizing cylinder 17, mounted in a carrier block 10. A driving unit A for axial displacement of the injection molding unit and an injection unit E for axially driving a feeding means, which is preferably a rotatable feed screw 72 arranged in the plasticizing cylinder 17, are provided inside the injection molding unit. Both, the driving unit and the injection unit, driven electromechanically, are arranged symmetrically with respect to the injection axis s—s and are integrated in the injection molding unit. Alternatively it is also possible to use hybrid drives, i.e., where one of the units, either the driving unit or the injection unit, is driven electromechanically, whereas the other unit is driven hydraulically. That way the advantages of the individual driving types can be favorably coupled.

An injection bridge 25 is connected with the injection molding unit, which injection bridge supports the rotation motor 26 for the rotation of the feed screw 72 or in case a piston aggregate is used, the feeding means "piston". As can be seen from FIGS. 3 and 4, spindles are provided for the driving unit A and the injection unit E. The spindles are arranged in a wing area 10a of the carrier block 10. The end section of the carrier block facing towards the mold is provided with bedding recesses, in which a ball bearing 48 for the bedding of the spindle nut 22 of the driving unit A, is provided behind a clamping nut 33. The spindle nut 22 is held in its position by a retaining plate 13, which is fixed at the carrier block (FIG. 6) via threaded bolts 21. The spindle nut is connected with pulleys 40, which are driven by a motor 50 via belts 29,29a. The belts 29,29a are arranged in order to produce a synchronous movement of the two driving units, symmetrically with respect to the injection axis s—s.

Figure 6:
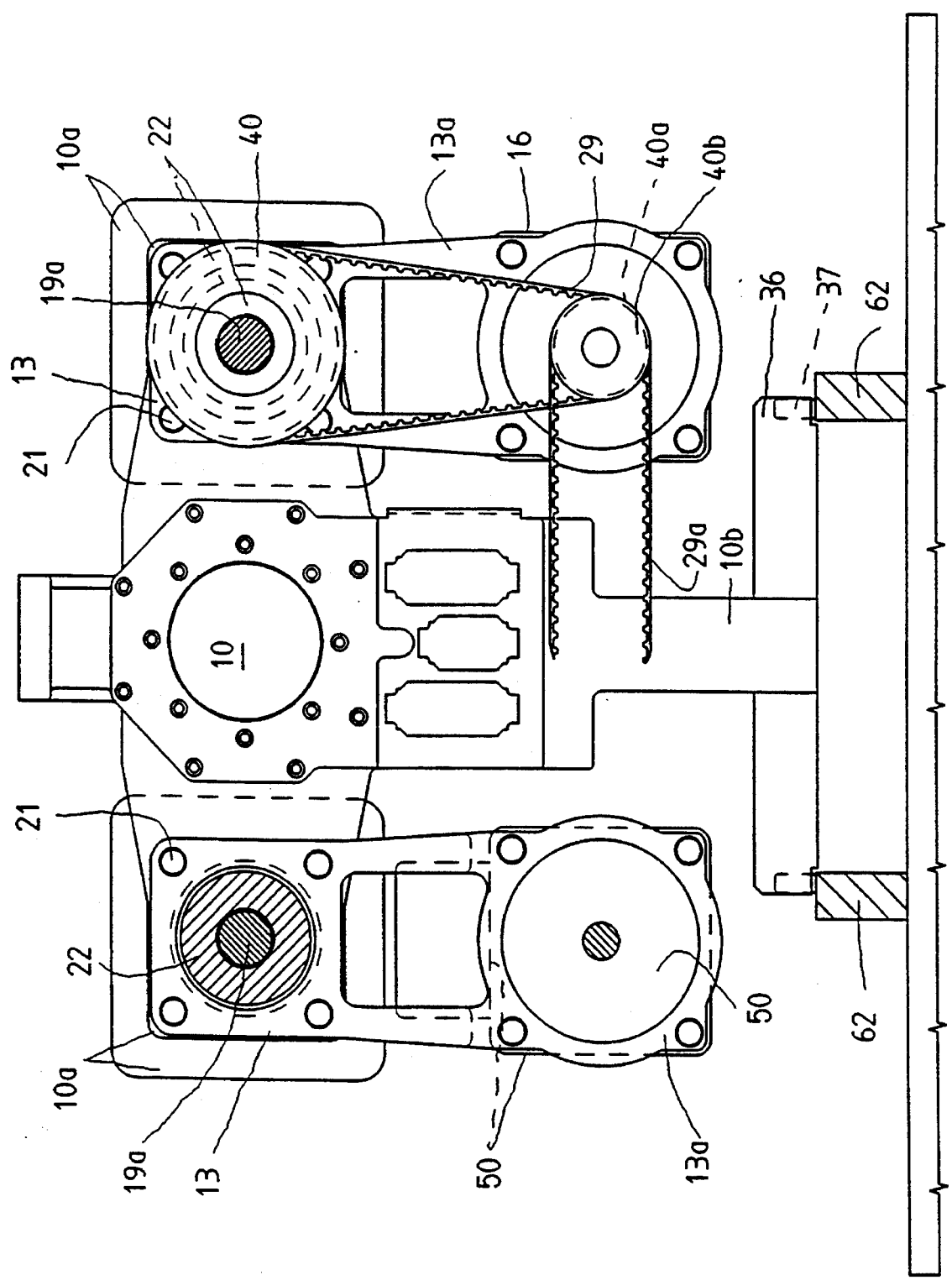

According to FIG. 6 the motor 50 is bedded at a forming 13a of the retaining plate 13 and also further pulleys 40a,40b are provided. When the belt drive is moved, the spindle nut 22 rotates in a spindle area 19a of the guide rod. The guide rod 19 is guided in a hollow spindle 18 in a guiding area 19b. The end sections of the guide rods 19 are bedded at any place outside the injection molding unit, for example at the stationary mold carrier of the mold closing unit, so that due to the rotation a movement of the injection molding unit is generated, which brings the nozzle D into contact with the mold closing unit. This way the injection molding unit is independant from the machine frame.

Figure 5:
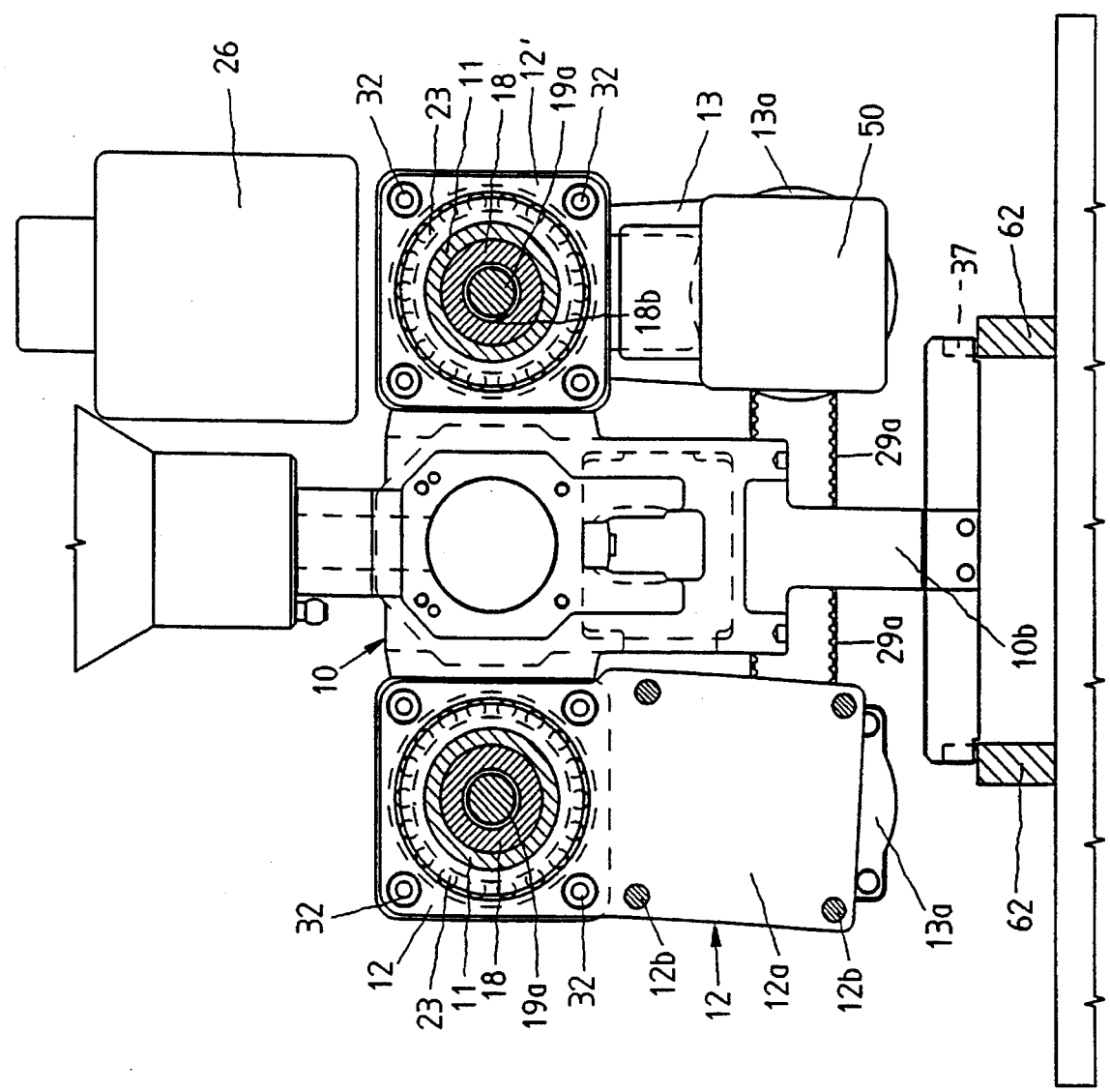
FIG. 5–8 are sectional views through the injection molding unit according to FIG. 1, along the lines 5—5, 6—6, 7—7 and 8—8.

At the other end section of the carrier block 10 a funnel-shaped recess is provided, in which the ball bearing 23 of the nut 11 of the injection unit E is received. A clamping nut 15 is in connection with the nut 11 and the ball bearing 23 is fixed in a recess of the carrier block 10 by the retaining plate 12,12'. The retaining plate 12 is provided with a forming 12a, in which the distance bolts 12b for the motor 51 of the injection unit E are fixed using screws 12C. The retaining plates 12,12' again are fixed at the carrier block by screws 32 (FIG. 5).

Figure 7:
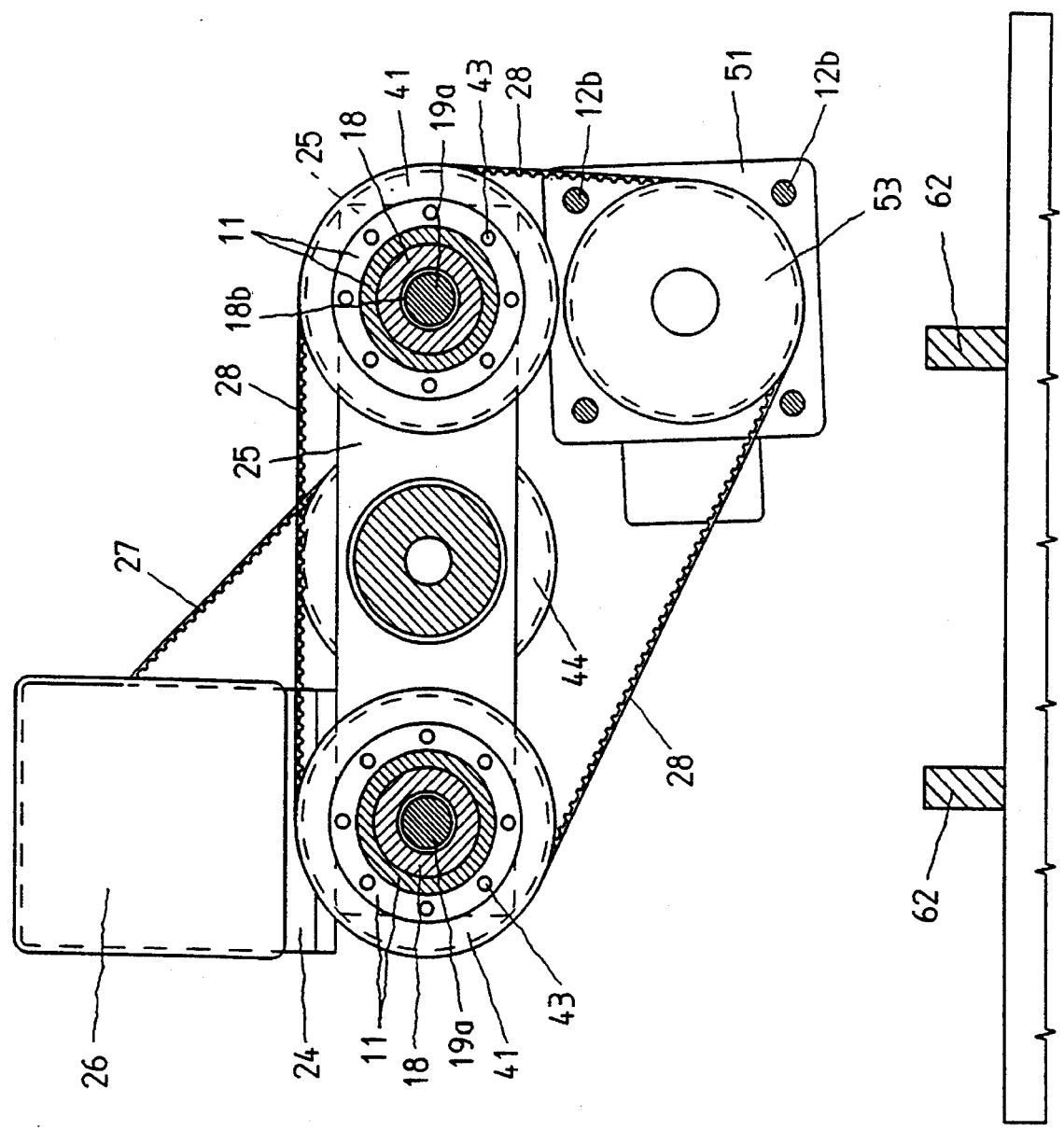

The nut 11 engages into a thread of the hollow spindle 18, which basically is displaceable along a deviation b (FIG. 4) extending between the two bearings arranged at the carrier block. Thus, according to the representation in FIG. 4 a distance b' remains for the movement. The nut 11 is connected with a pulley 41 via clamping bolts 43. The pulley 41 is driven by the motor 51 of the injection unit E via the pulley 53 and a belt 28 for translation of the feed screw 72 (FIG. 7), so that the two injection units are synchronously shifted when the belt drive is in motion. When the nut rotates, the hollow spindle 18 runs a path along the distance b. During this process the stationary guide rod 19 slides in a hollow space 18b of the hollow spindle 18. The injection bridge 25 is fixed in the end section 18a of the hollow spindle 18 by a clamping plate 14, which at the same time serves as a guiding for the guide rod 19. The clamping plate 14 on the other hand is connected with the injection bridge 25 by screws 42. A positioning of the injection bridge can be achieved via the adjusting nut 30, which engages into an external thread 18d of the hollow spindle 18.

Figure 3:
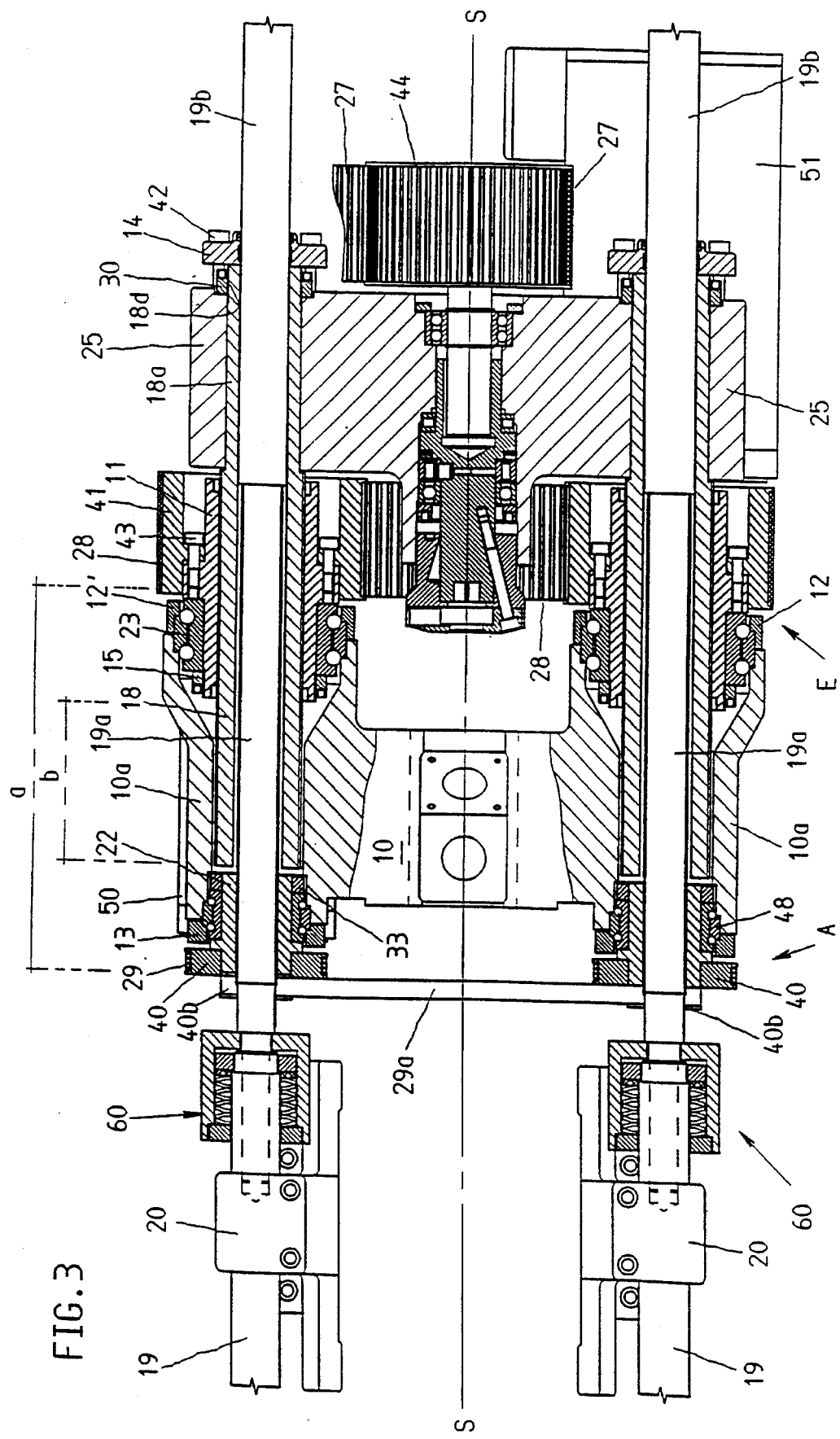
FIG. 3 is an enlarged, partially sectional detail view of the injection molding unit.
Figure 4:
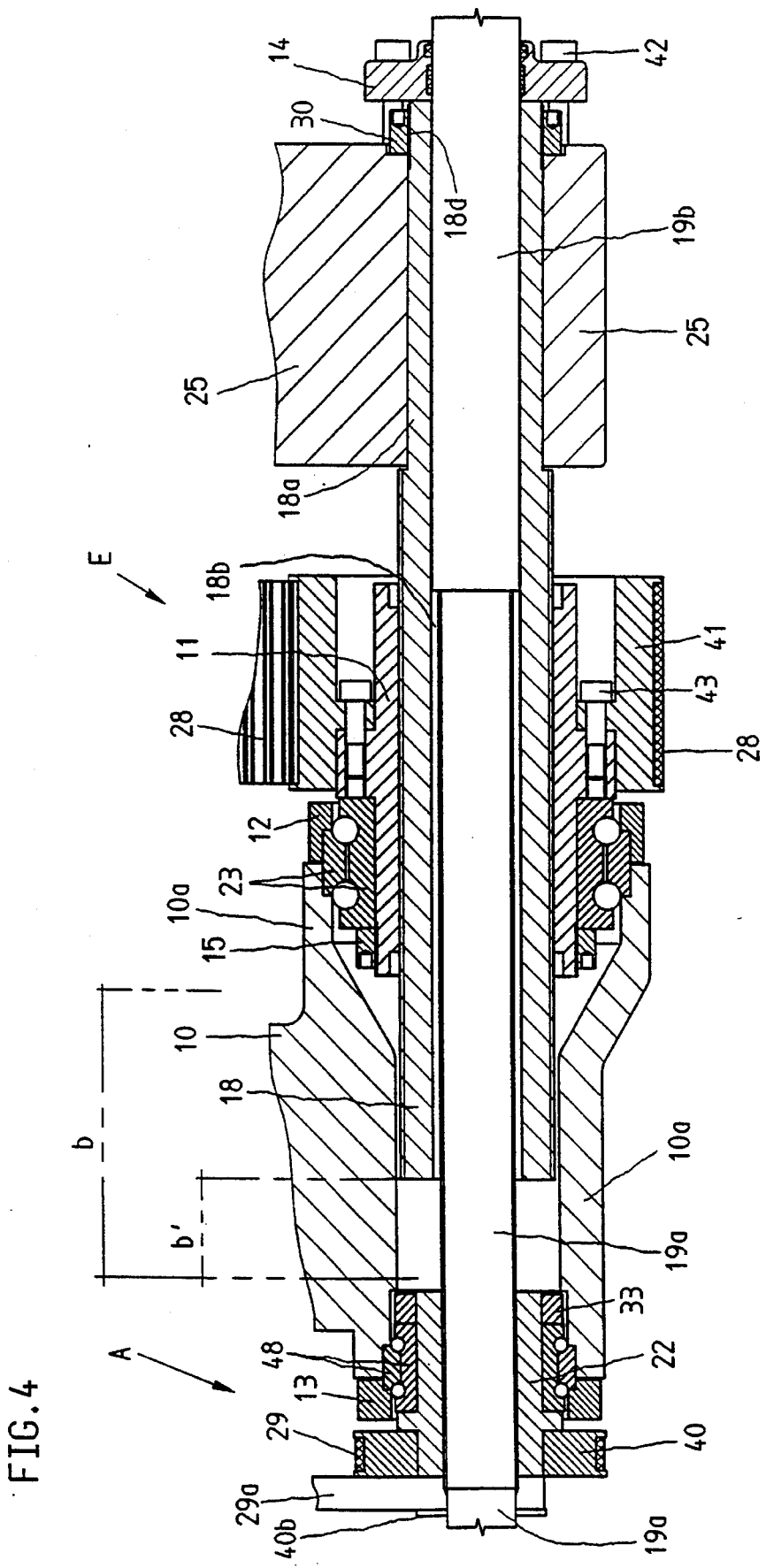
FIG. 4 is an enlarged detail view in the area of one guide rod of FIG. 3
Figure 12:
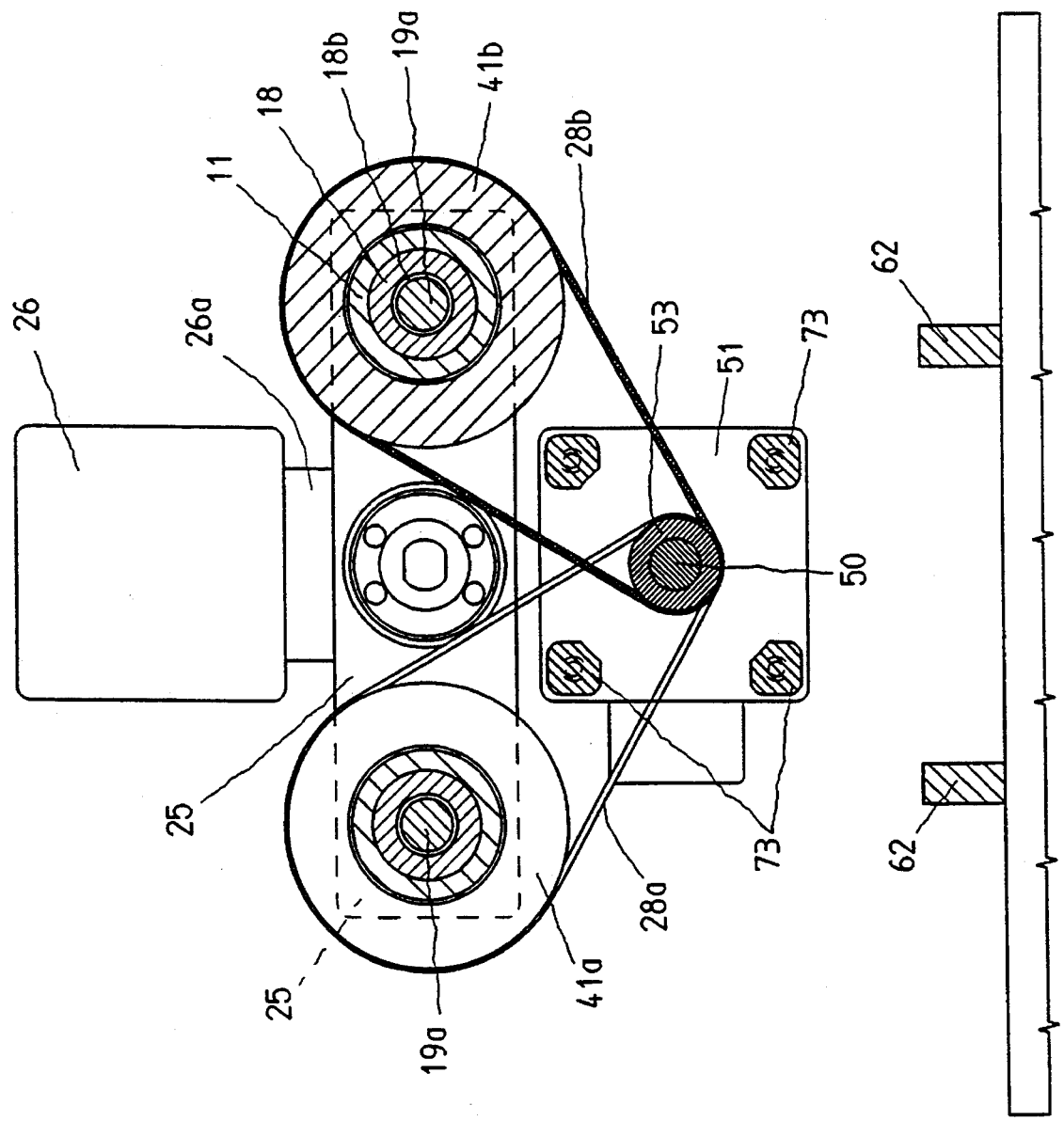
FIG. 12 is a sectional view through the injection molding unit along line 12—12 of FIG. 11

A pulley 44 connected by a belt 27 with the pulley 52, which is associated to the rotation motor 26 and generates the rotational movement of the feed screw, is arranged at the injection bridge 25. Alternatively, as shown in FIG. 12, it is also possible to connect a gearing 26a to the rotation motor 26 in such a way, that a rotation is transferable to the feed screw 72. The rotation motor 26 is connected with the injection bridge 25 by a flange 24, so that it is jointly movable with the injection bridge. In order to reduce the masses to be moved, it is also possible to arrange this motor at the carrier block by a keyway connection. The plasticizing cylinder 17 is mounted at the carrier block by a nut 34. However, as can be seen from FIG. 1 enough space is available to also allow the provision of automatizable drives, which for example can be arranged at the perimeter of the nut 34 to fix the plasticizing cylinder at the carrier block. FIGS. 2, 3 and 4 indicate the maximum possible deviation a of the driving unit, the remaining represented path being refered to as a'. In FIG. 6 a bearing plate for the pulleys 40a, 40b is refered to as 16.

From the construction of the driving unit and the injection unit according to FIGS. 3 and 4 it can be infered that both units are nested as one constructional unit and that they are fixable in the carrier block 10 merely by the retaining plates 12,12' and 13. This enables combinations of mechanical and hydraulical units E, A., respectively, which again lead to a shorter construction. The prefered use of a hollow spindle eliminates the disadvantages generally assigned to spindle drives, since the diameter of the spindle drive for the movement of the feed screw 72 is enlarged by the application of the hollow spindle type and consequently offers a high dynamic carrying capacity, which increases the life of the spindle drive. Besides, the large diameter of this "double spindle" reinforces the driving unit, so that the transmission of the forces occuring is ensured. An arrangement of this kind offers the advantage for the manufacturer, that the hydraulically nested driving and injection units, as described for example in German Post-Published Patent 41 42 927, can be exchanged by electromechanical ones, as desired, since the hydraulic axles are replaced by electrical ones. This helps to obtain an injection molding machine of a modular construction.

Furthermore, the driving unit A and the injection unit E as one constructional unit in connection with the injection bridge 25, are insertable into the bore holes of the carrier block 10 with little expenditure of work. The driving unit and the injection unit can be checked as to their operativeness before mounting, so that in case a disturbance should occur, an exchange can be carried out very easily in the buyers' factory. Thus the stop-down times can be essentially reduced. As far as possible the motors for the drives are arranged at the carrier block 10, so that the motor masses are largely decoupled from the injection processes for most of the movements. This makes it possible to realize high dynamic injection processes. But also if movements take place, the distance between the injection unit and the driving unit is largely the same, so that the center of gravity the injection molding unit is held in its support area and besides, no cantilevered systems can arise, which would stress the driving unit and the injection unit additionally.

Figure 2:
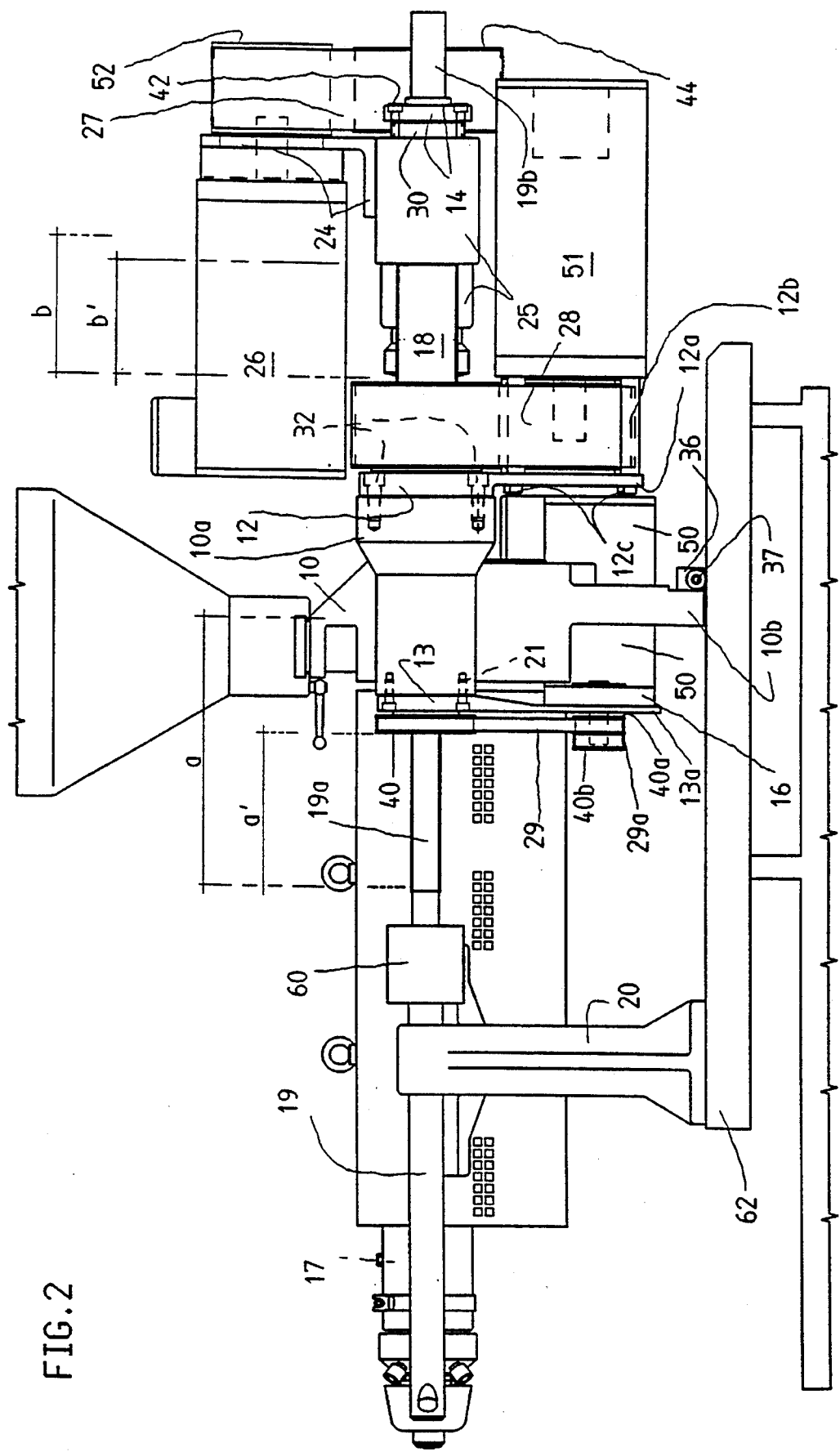
FIG. 2 is a side view of the injection molding unit according to FIG. 1.
Figures 9, 10:
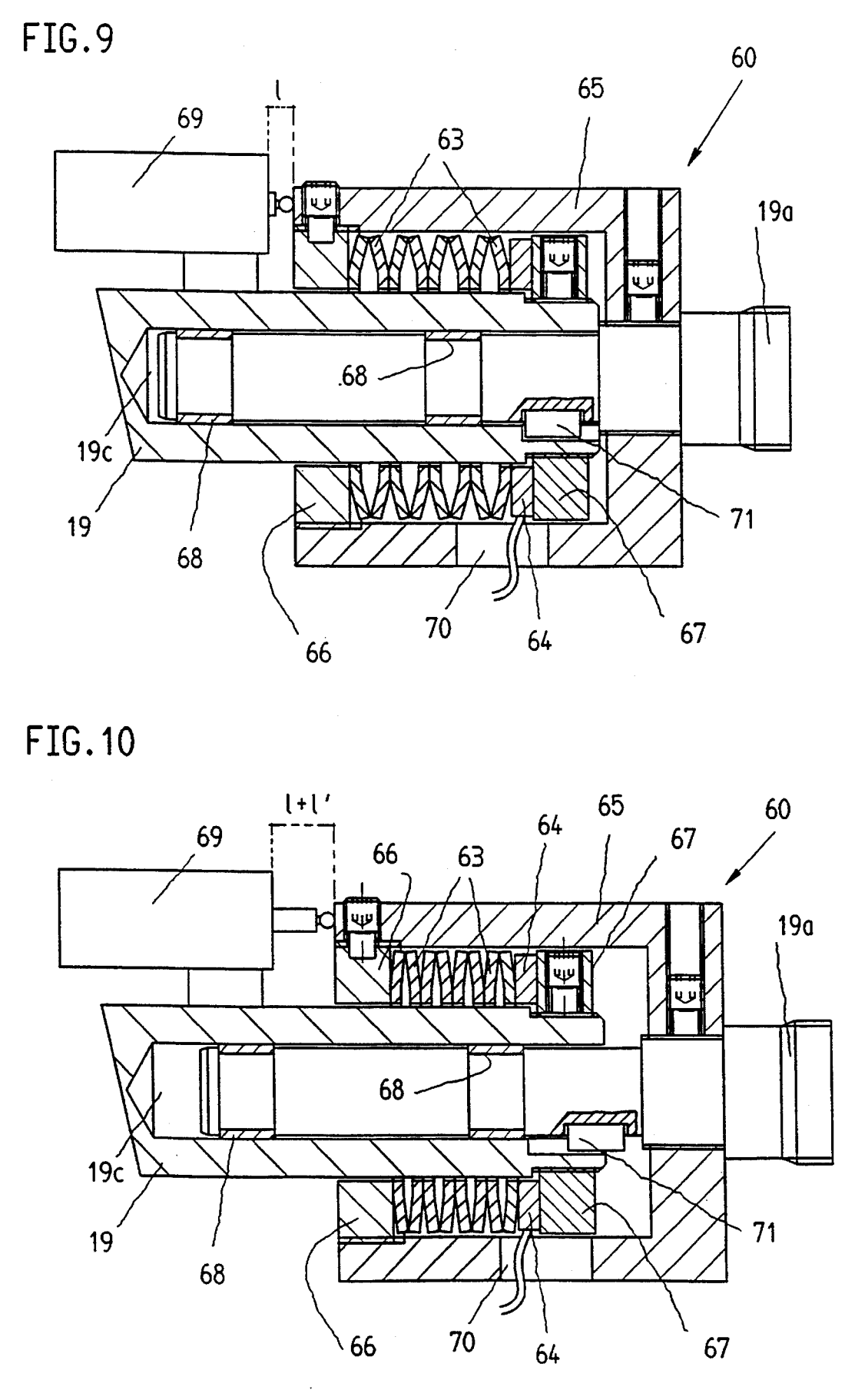

The FIGS. 9 and 10 show a sectional view through the die cushions 60 represented in FIGS. 1 and 2. For this purpose the guide rod 19 is divided into two parts and is provided at its front area with a recess 19c. The rear area is formed by the spindle area 19a and the guiding area 19b. This rear area is guided in the recess 19c in slide bearings 68. A twisting safety device 71 is provided, in order to avoid that the front and rear areas are twisted. The seat 65 of the die cushion 60 overlaps a supporting ring 67 with an internal thread fixed at the front part of the guide rod 19. The seat 65 itself is provided with a supporting ring 66 with an external thread. A spring assembly 63, which is stressed during the nozzle contacting, is arranged between the two supporting rings, as can be seen from a comparison between FIG. 9 and 10. A pressure sensor 64 measures the pressure arising during this process and transmits its signals to the control unit of the injection molding machine via the recess 70. The route distance L or L+L', which corresponds to the actual nozzle pressure force, can be measured by a linear potentiometer 69. If an electromechanical driving unit is applied, this makes it possible to regulate the nozzle contacting force.

The guide rods 19 serve as an abutment for the injection molding unit, so that the injection molding unit is freely movable. It is supported by a supporting area 10b of the carrier block and carrying elements 20 on a strip 62. During the axial movement the injection molding unit can be moved on this strip 62 via support reels 37, which are arranged on a support strip 36. It is possible to arrange the injection molding unit on transverse rails in a similar manner, so that it can be transversely moved without problems. The injection molding unit is additionally supported by the bearing of the guide rods 19, which should also be mounted movably; however, the guide rods must be also fixed detachably, in order to define the injection molding unit at a point at the machine base, making possible a rotation of the injection molding unit, so as to make the feed screw or the feeding means easily accessible for cleaning purposes.

Figure 11:
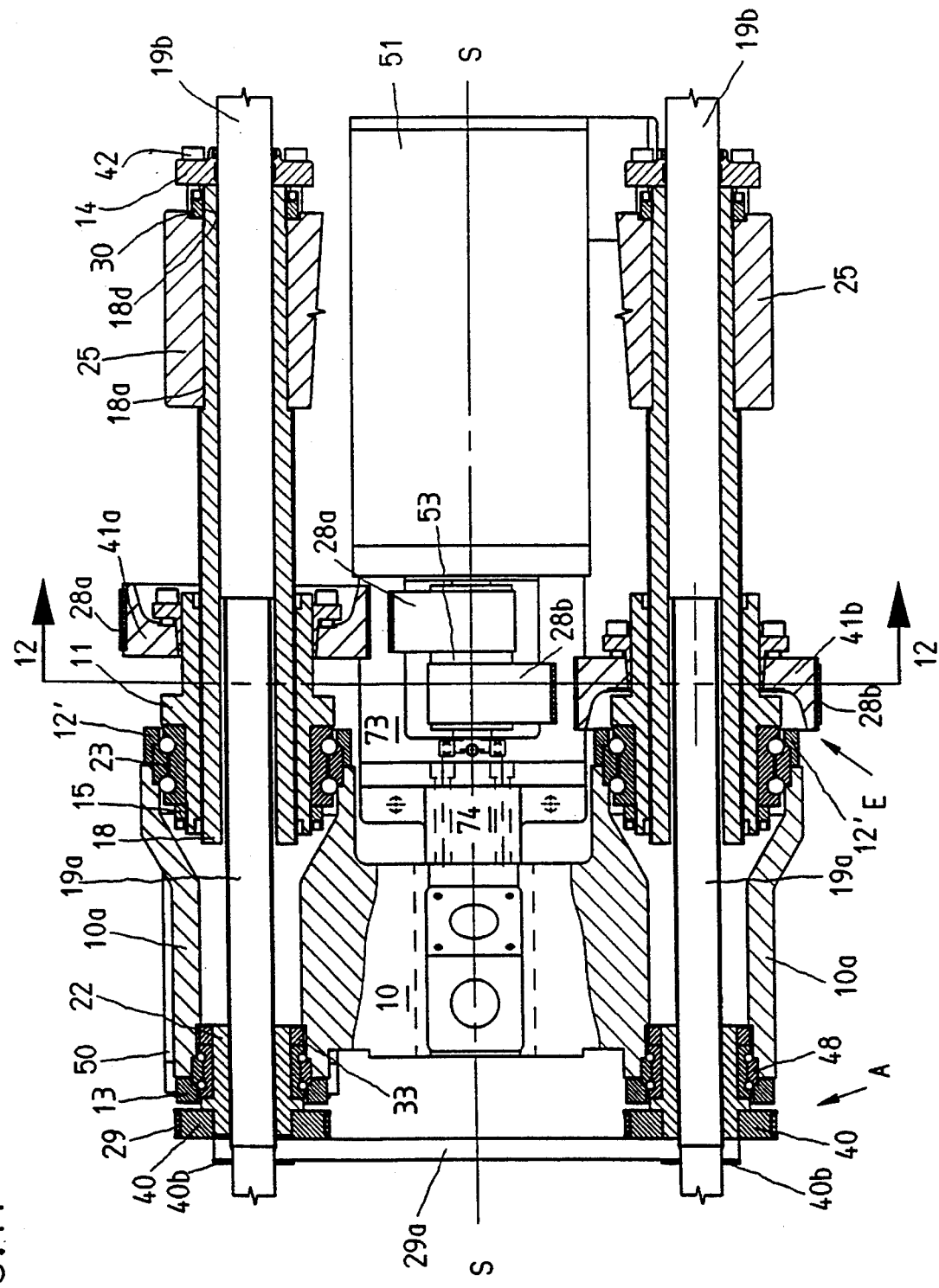
FIG. 11 is a representation according to FIG. 3 of a further embodiment of the injection molding unit.

The FIGS. 11, 12 show a further embodiment, which differs from the first embodiment in that the injection molding unit E is driven via two belts 28a, 28b, which are driven by the same motor shaft of the motor 51. The motor 51 is flanged to the carrier block 10 by a intermediate flange 74 and a motor flange 73. The two belts 28a,28b, smaller in comparision to those used in the first embodiment, run via the pulleys 53 of the motor shaft and drive two smaller pulleys 41a, 41b. Although two belts are always used, it is also possible to drive further spindles in this manner. Compared with the first embodiment, the belts here are minimized, since only half of the torque has to be transfered. Also, a toothed wheel of smaller size can be chosen for the motor shaft, since due to the more favorable angle of belt contact, the engaging minimum number of teeth is increased when a toothed belt is used. A higher gearing down using less constructional space is made possible by the reduction of the diameter of the toothed wheel. Since the pulleys 41a and 41b are additionally reduced as to their breadth, the mass moments of inertia, occuring during acceleration and deceleration, are lowered. A drive mechanism A offering the same advantages could also be realized, if the motor for the driving unit is arranged correspondingly.

Figure 8:
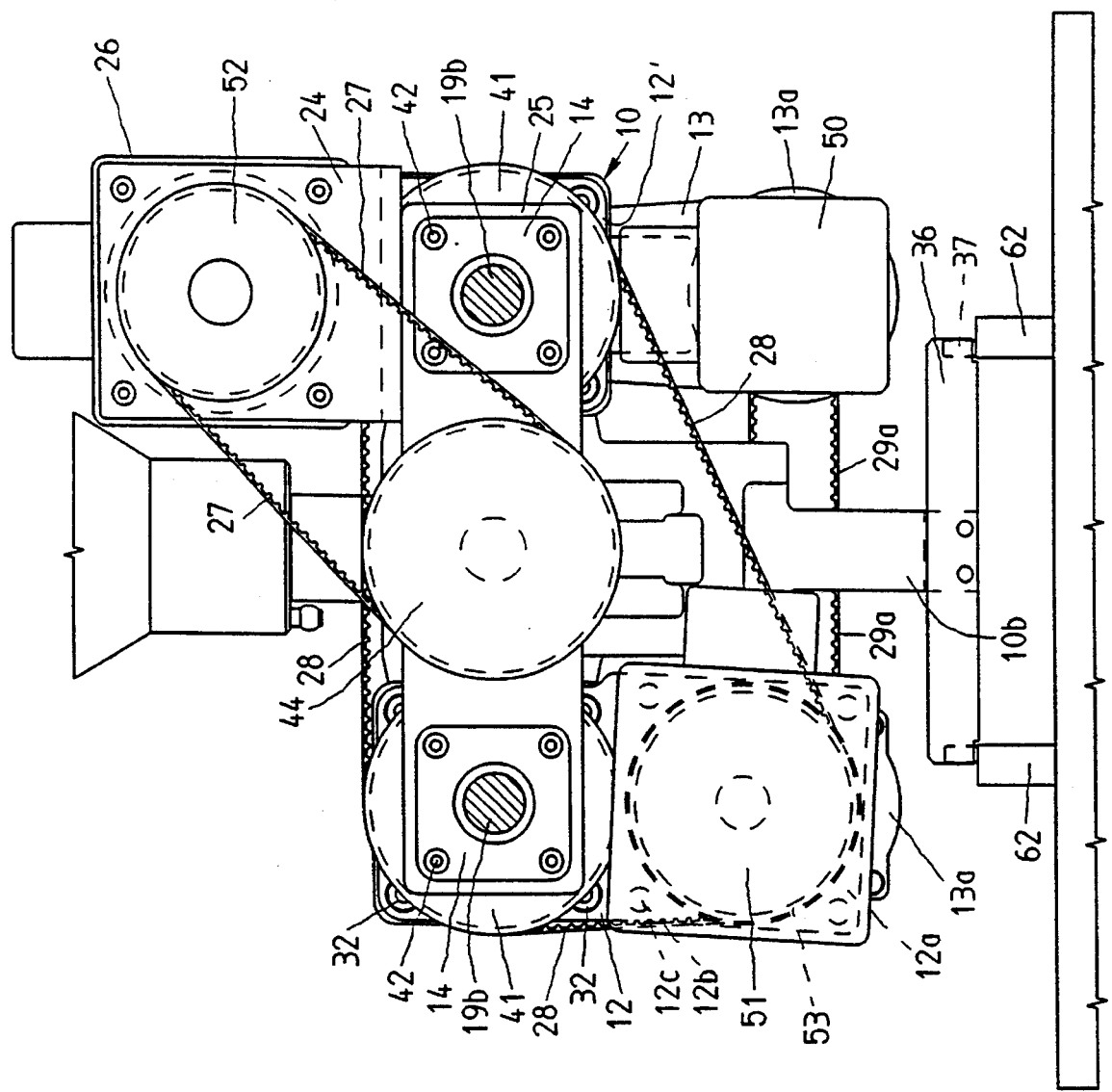
Figure 13:
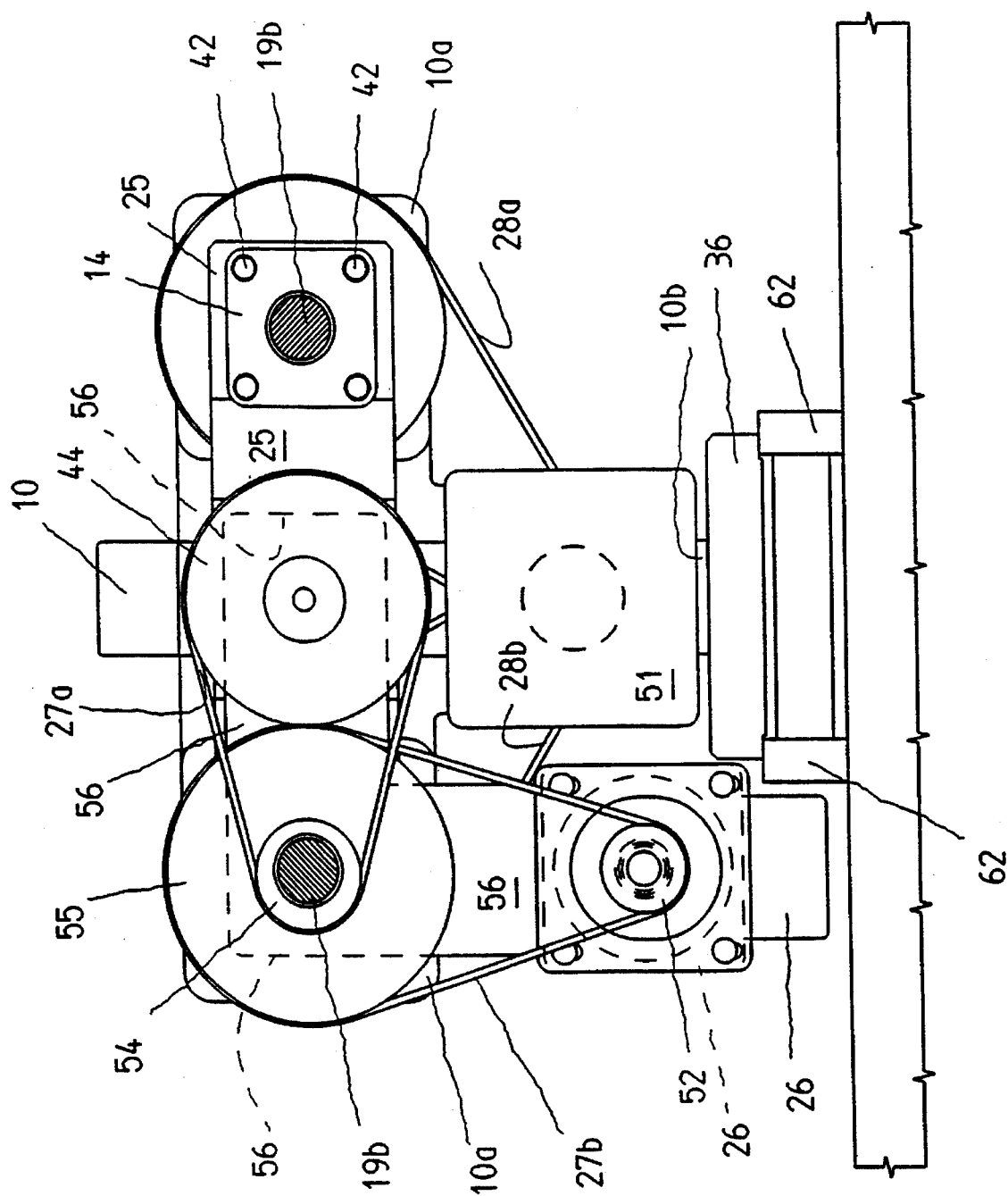
FIG. 13 is a representation according to FIG. 8 in a third embodiment comprising an alternative drive for the screw rotation.
Figure 14:
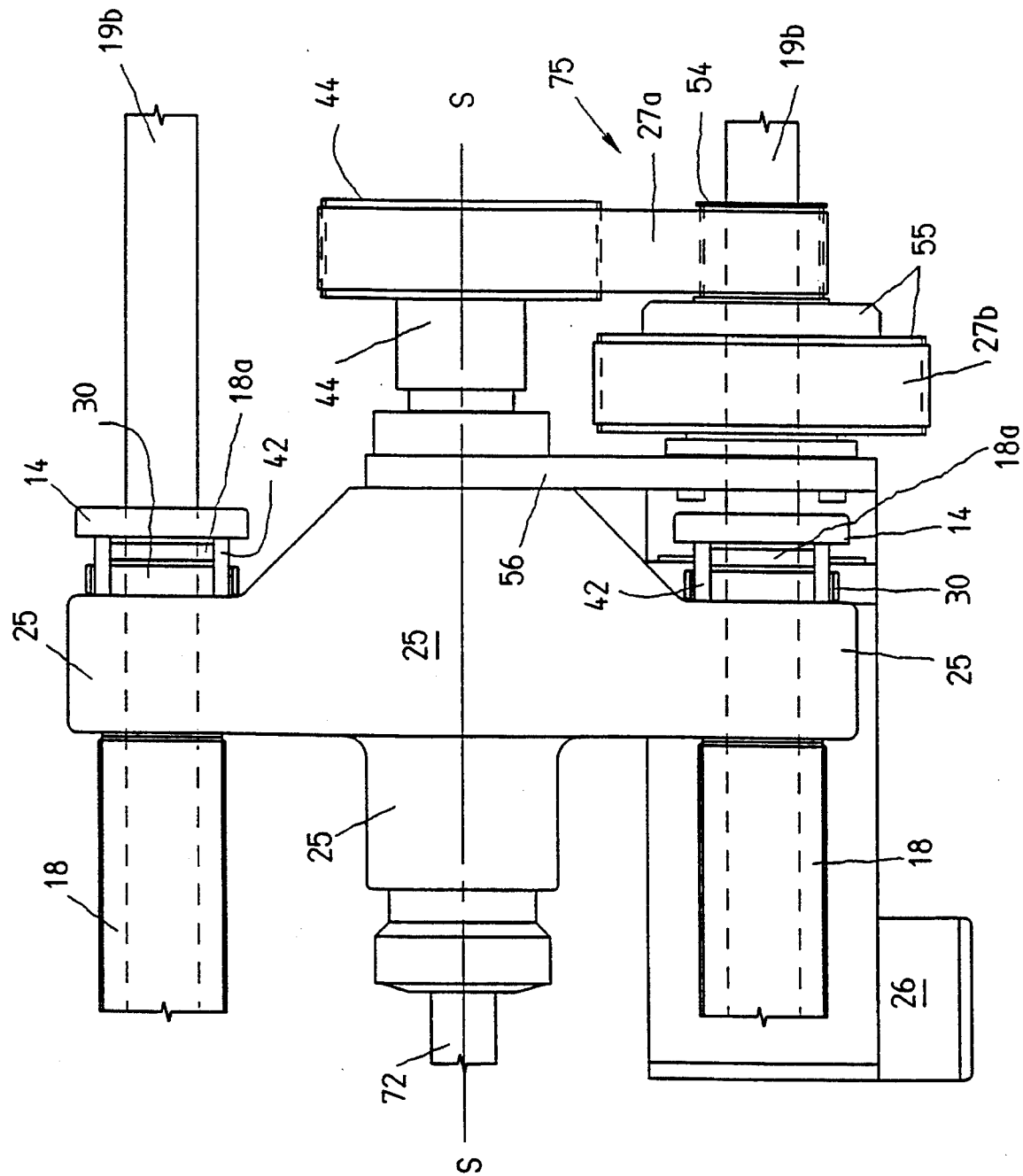
FIG. 14 is a top view of the area represented in FIG. 13.

In the FIGS. 13, 14 an alternative rotatary screw drive is represented in a third embodiment. Compared with FIG. 8, in this arrangement the drive 75 is changed to a place lying laterally downwards, which anyhow is required due to the type of construction of the injection molding unit. In order to get past the motor 51 for the axial movement of the feed screw 72, two belt drives are used, so that from the pulley 52 via the belt 27b initially a two-stage pulley transmission is driven, the pulleys 54 and 55 being fixedly interconnected. Parting from the pulley 54 a concentric pulley 44 connected with the feed screw 72 is driven via the belt 27a. The pulleys 54,55 are bedded at the guide rod 19 by an eccentric, in order to make possible a clamping for the belt 27a. The rotation motor itself is held in its position by a plate and can be displaced there for clamping of the belt 27b in a longitudinal hole (not graphically represented). The pulleys 54, 55 represent a transmission so that a smaller motor with a higher number of revolutions can be applied as rotation motor. Since the motor is arranged in a space which anyhow is required for operating the injection molding machine, a more compact construction type is achieved, and compared with the embodiment shown in the FIGS. 11 and 12, expensive gearing can be avoided.

Figure 15:
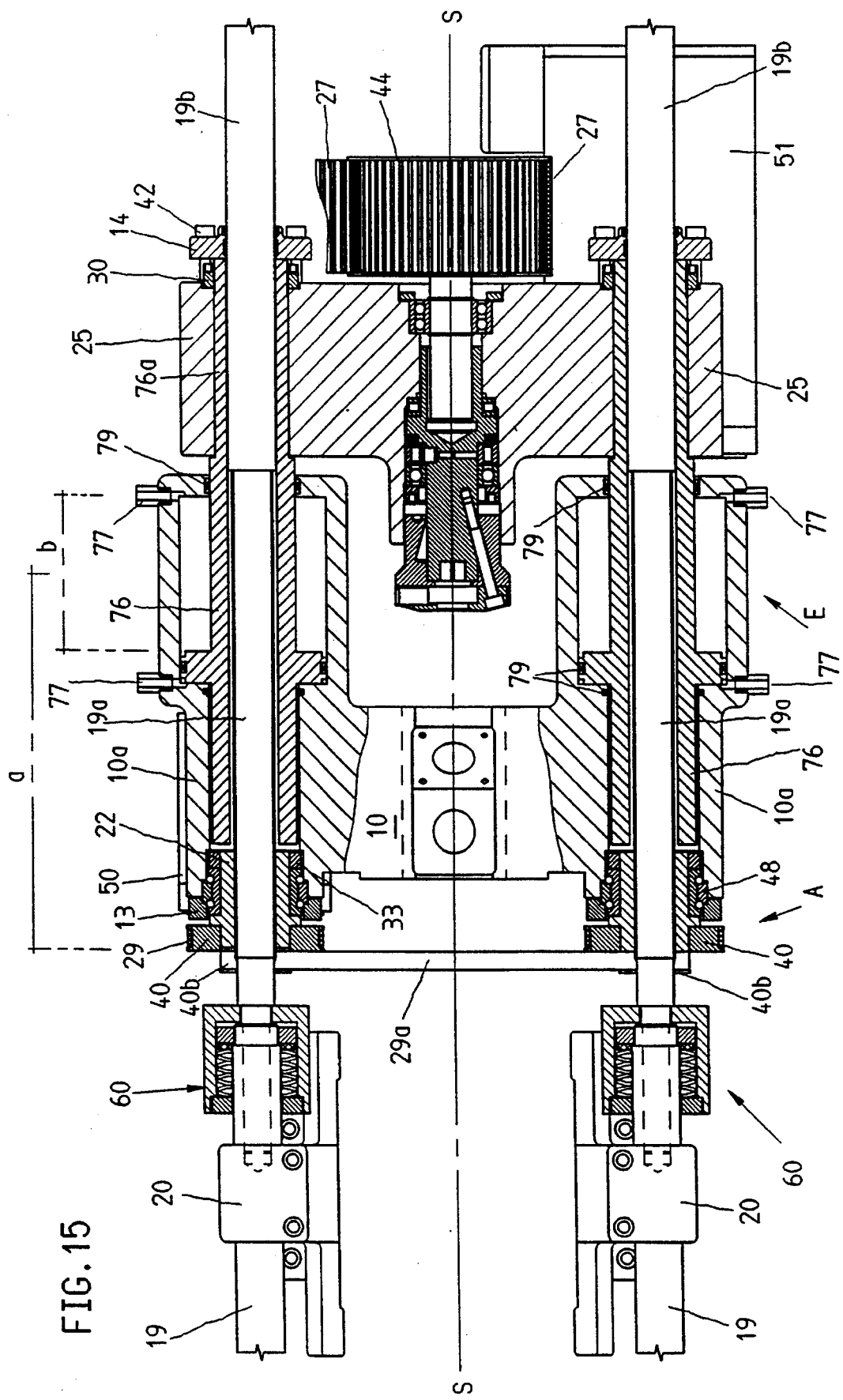
FIG. 15,16 are representations according to FIG. 3 in a forth and fifth embodiment; in these Figures hydraulic and electromechanical units are combined.
Figure 16:
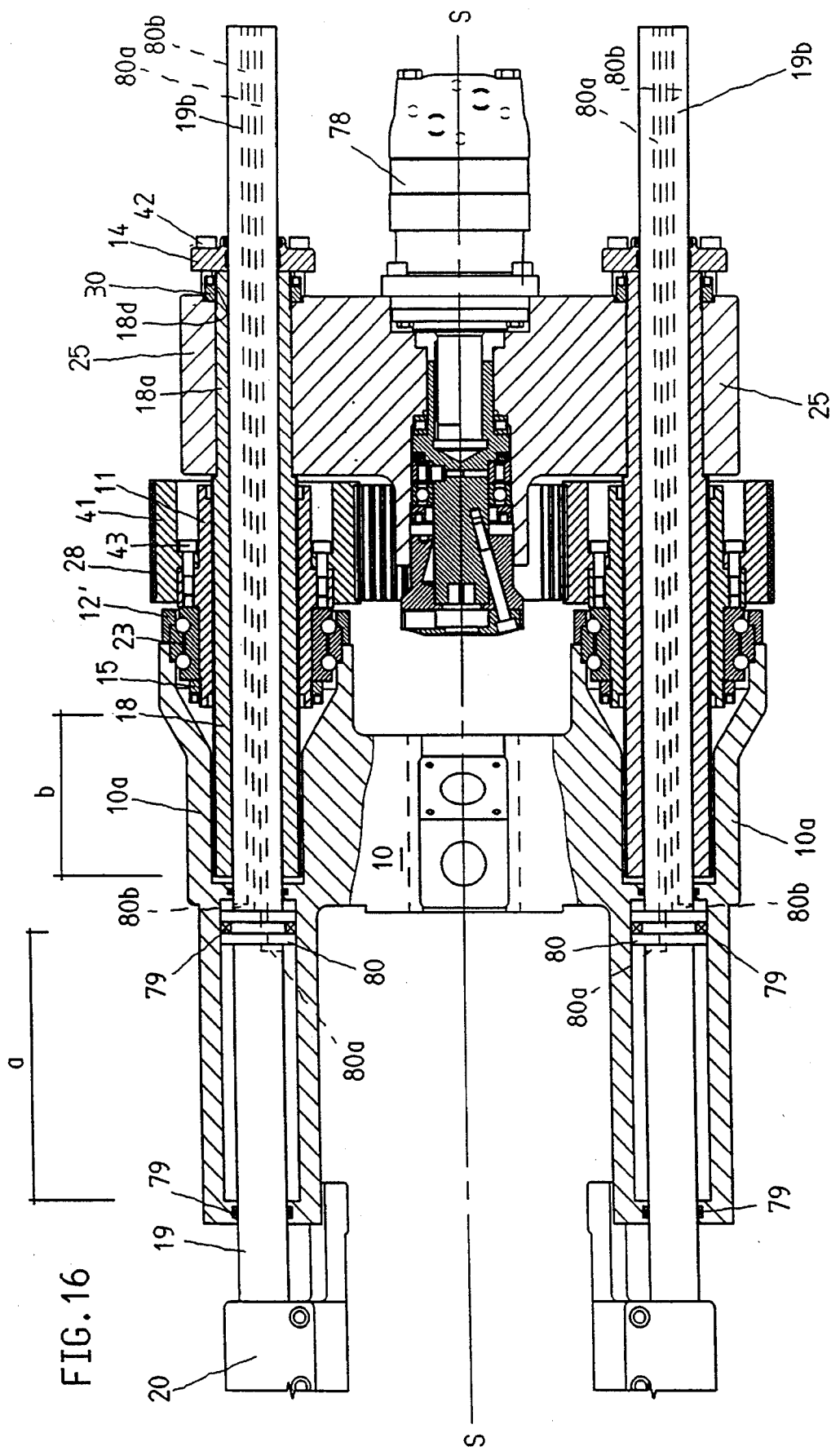

The FIGS. 15, 16 show two further embodiments, in which either a hydraulic injection unit E is combined with an electromechanical drive unit A (FIG.15) or an electromechanical injection unit E is combined with a hydraulic drive unit A (FIG. 16). In FIG. 15 the injection piston 76, which is bedded at the injection bridge by an end section 76a, is of the same design as those in the other embodiments. Cylinder chambers of the driving unit, sealed by gaskets 79 and supplied by hydraulic connections 77, are arranged coaxially with respect to the injection pistons. FIG. 16 reveals that the guiding area 19b is the piston rod of the driving unit and lies coaxially to the electromechanical injection unit E. The cylinder chamber, lying in front of the piston area 80 of the driving unit, is supplied with a hydraulic medium by the bore holes 80a,80b. The drive for the rotation of the feed screw 72 (FIG. 1) is a hydro motor 78.

I claim:

1. An injection molding unit for use in an injection molding machine for processing synthetic materials comprising, a carrier block, a plasticizing cylinder having a longitudinal center line and mounted in said carrier block so that the longitudinal center line defines an injection axis, a mechanical driving unit arranged symmetrically with respect to the injection axis, said mechanical driving unit axially displacing said injection molding unit in a direction of the injection axis, a feeding means for feeding the synthetic materials arranged inside said plasticizing cylinder, a mechanical injection unit arranged symmetrically with respect to the injection axis and in line with said mechanical driving unit and being adapted to axially drive said feeding means in a direction of the injection axis, and an injection bridge connected with said injection unit.

2. The injection molding unit set forth in claim 1, wherein the injection molding machine includes a plurality of guide rods, each guide rod having an end section fixed at a location outside of said injection molding unit, each guide rod having a spindle area; and wherein said driving unit comprises a plurality of electromechanically driven spindles formed by a spindle area of the guide rods, the end sections of the guide rods serving as an abutment for said injection molding unit to define a limiting position of the axial displacement of said injection molding unit.

3. The injection molding unit set forth in claim 1, wherein the injection molding machine comprises at least one guide rod having a guiding area; and wherein said injection unit includes at least one electromechanically driven hollow spindle inside which the guiding area of the at least one guide rod is guided; said hollow spindle comprising a spindle area cooperating with a spindle nut to form said driving unit.

4. The injection molding unit set forth in claim 3, wherein said injection bridge is adjustable in an end section of said hollow spindle by an adjusting nut and is fixed by a clamping plate, penetrated by screws supported at said injection bridge.

5. The injection molding unit set forth in claim 1, wherein said driving unit and said injection unit are together fixed in said carrier block as a constructional unit by retaining plates.

6. The injection molding unit set forth in claim 1, further comprising a motor for generation of an axial movement of said feeding means; wherein said injection unit comprises a plurality of hollow spindles, at least two of said hollow spindles being driven by a motor shaft of said motor and by at least two belts for translation of said feeding means.

7. The injection molding unit set forth in claim 1, wherein said driving unit comprises a motor arranged at said carrier block, said motor driving pulleys via belts, said motor being connected with spindle nuts of said driving unit, said spindle nuts being rotatably located at said carrier block.

8. The injection molding unit set forth in claim 1, wherein said feeding means is a rotatable feed screw; further comprising a driving mechanism generating a rotational movement of said feed screw via belts for rotation of said feed screw and being arranged in an area next to a motor of said injection unit, said driving mechanism comprising a transition pulley eccentrically mounted on a guide rod.

9. The injection molding unit set forth in claim 1, wherein said driving unit is mounted and is axially movable in die cushions biased by springs.

10. An injection molding unit for use in an injection molding machine for processing synthetic materials comprising, a carrier block, a plasticizing cylinder having a longitudinal center line and mounted in said carrier block so that the longitudinal center line defines an injection axis, a hydraulically driven driving unit arranged symmetrically with respect to the injection axis said driving unit axially displacing said injection molding unit in a direction of the injection axis, a feeding means for feeding the synthetic materials arranged inside said plasticizing cylinder, a mechanical injection unit arranged symmetrically with respect to the injection axis and in line with said driving unit and being adapted to axially drive said feeding means in a direction of the injection axis, and an injection bridge connected with said injection unit.

11. The injection molding unit set forth in claim 10, wherein the injection molding machine comprises at least one guide rod having a guiding area; and wherein said injection unit includes at least one electromechanically driven hollow spindle inside which the guiding area of the at least one guide rod is guided; said hollow spindle comprising a spindle area cooperating with a spindle nut to form said driving unit.

12. The injection molding unit set forth in claim 11, wherein said injection bridge is adjustable in an end section of said hollow spindle by an adjusting nut and is fixed by a clamping plate penetrated by screws supported at said injection bridge.

13. The injection molding unit set forth in claim 10, wherein said driving unit and said injection unit are together fixed in said carrier block as a constructional unit by retaining plates.

14. The injection molding unit set forth in claim 10, further comprising a motor for generation of an axial movement of said feeding means; wherein said injection unit comprises a plurality of hollow spindles, at least two of said hollow spindles being driven by a motor shaft of said motor and by at least two belts for translation of said feeding means.

15. The injection molding unit set forth in claim 10, wherein said feeding means is a rotatable feed screw; further comprising a driving mechanism generating a rotational movement of said feed screw via belts for rotation of said feed screw and being arranged in an area next to a motor of said injection unit, said driving mechanism comprising a transition pulley eccentrically mounted on a guide rod.

16. The injection molding unit set forth in claim 10, wherein said driving unit is mounted and is axially movable in die cushions biased by springs.

17. An injection molding unit for use in an injection molding machine for processing synthetic materials comprising, a carrier block, a plasticizing cylinder having a longitudinal center line and mounted in said carrier block so that the longitudinal center line defines an injection axis, a mechanical driving unit arranged symmetrically with respect to the injection axis, said mechanical driving unit axially displacing said injection molding unit in a direction of the injection axis, a feeding means for feeding the synthetic materials arranged inside said plasticizing cylinder, a hydraulically actuated injection unit arranged symmetrically with respect to the injection axis and in line with said mechanical driving unit and being adapted to axially drive said feeding means, and an injection bridge connected with said injection unit.

18. The injection molding unit set forth in claim 17, wherein the injection molding machine includes a plurality of guide rods each having an end section fixed at a location outside of said injection molding unit, each guide rod having a spindle area; wherein said driving unit comprises a plurality of electromechanically driven spindles formed by the spindle area of the guide rods for guiding said injection molding unit; the end sections serving as an abutment for said injection molding unit to define a limiting position of the axial displacement of said injection molding unit.

19. The injection molding unit set forth in claim 17, wherein said driving unit and said injection unit are together fixed in said carrier block as a constructional unit by retaining plates.

20. The injection molding unit set forth in claim 17, wherein said driving unit comprises a motor arranged at said carrier block, said motor driving a plurality of pulleys via belts, said motor being connected with spindle nuts of said driving unit, said spindle nuts being rotatably located at said carrier block.

21. The injection molding unit set forth in claim 17, wherein said feeding means is a rotatable feed screw; further comprising a driving mechanism generating a rotational movement of said feed screw via belts for rotation of said feed screw and being arranged in an area next to a motor of said injection unit, said driving mechanism comprising a transition pulley eccentrically mounted on a guide rod.

22. The injection molding unit set forth in claim 17, wherein said driving unit is mounted and axially movable in die cushions biased by springs.

23. An injection molding unit for use in an injection molding machine, the injection molding machine being for processing synthetic materials and having a plurality of guiding elements each having an end section fixed at a location outside of said injection molding unit, comprising;

a carrier block;

a plasticizing cylinder having a longitudinal center line and mounted in said carrier block so that the longitudinal center line defines an injection axis;

a mechanical driving unit arranged symmetrically with respect to the injection axis, said mechanical driving unit axially displacing said injection molding unit in a direction of the injection axis; the end sections of the guiding elements serving as an abutment for said injection molding unit to define a limiting position of the axial displacement of said injection molding unit;

a feeding means for feeding the synthetic materials arranged inside said plasticizing cylinder;

a mechanical injection unit arranged symmetrically with respect to the injection axis and in line with said mechanical driving unit and being adapted to axially drive said feeding means in a direction of the injection axis, said injection unit and said driving unit being arrange along the guiding elements; and an injection bridge connected with said injection unit.

24. An injection molding unit for use in an injection molding machine, said injection molding machine being for processing synthetic materials and having a plurality of guiding elements each having an end section fixed at a location outside of said injection molding unit, comprising;

a carrier block;

a plasticizing cylinder having a longitudinal center line and mounted in said carrier block so that the longitudinal center line defines an injection axis;

a hydraulically driven driving unit arranged symmetrically with respect to the injection axis, said driving unit axially displacing said injection molding unit in a direction of the injection axis, the end sections of the guiding elements serving as an abutment for said injection molding unit to define a limiting position of the axial displacement of said injection molding unit;

a feeding means for feeding the synthetic materials arranged inside said plasticizing cylinder;

a mechanical injection unit arranged symmetrically with respect to the injection axis and in line with said driving unit and being adapted to axially drive said feeding means in a direction of the injection axis, said injection unit and said driving unit being arranged along the guiding elements; and an injection bridge connected with said injection unit.

25. An injection molding unit for use in an injection molding machine, the injection molding machine being for processing synthetic materials and having a plurality of guiding elements each having an end section fixed at a location outside of said injection molding unit, comprising;

a carrier block;

a plasticizing cylinder having a longitudinal center line and mounted in said carrier block so that the longitudinal center line defines an injection axis;

a mechanical driving unit arranged symmetrically with respect to the injection axis, said mechanical driving unit axially displacing said injection molding unit in a direction of the injection axis, the end sections of the guiding elements serving as an abutment for said injection molding unit to define a limiting position of the axial displacement of said injection molding unit;

a feeding mens for feeding the synthetic materials arranged inside said plasticizing cylinder;

a hydraulically actuated injection unit arranged symmetrically with respect to the injection axis and in line with said mechanical driving unit and being adapted to axially drive said feeding means, said injection unit and said driving unit being arranged along the guiding elements; and an injection bridge connected with said injection unit.

* * * * *